(12) United States Patent
Mahoney et al.

(10) Patent No.: US 8,430,409 B2
(45) Date of Patent: Apr. 30, 2013

(54) MAGNETIC FLUID SEAL WITH PRECISE CONTROL OF FLUID VOLUME AT EACH SEAL STAGE

(75) Inventors: David G. Mahoney, Londonderry, NH (US); Walter Helgeland, Charlton, MA (US)

(73) Assignee: Rigaku Innovative Technologies, Inc., Auburn Hills, MI (US)

( * ) Notice: Subject to any disclaimer, the term of this patent is extended or adjusted under 35 U.S.C. 154(b) by 543 days.

(21) Appl. No.: 12/252,829

(22) Filed: Oct. 16, 2008

(65) Prior Publication Data
US 2009/0127794 A1 May 21, 2009

Related U.S. Application Data

(60) Provisional application No. 60/980,977, filed on Oct. 18, 2007.

(51) Int. Cl.
*F16J 15/43* (2006.01)
(52) U.S. Cl.
USPC ........................................................ 277/410
(58) Field of Classification Search .................... 277/410
See application file for complete search history.

(56) References Cited

U.S. PATENT DOCUMENTS

| 4,440,402 | A | | 4/1984 | Pinkus et al. |
| 4,445,696 | A | * | 5/1984 | Raj et al. ........................ 277/410 |
| 4,501,566 | A | * | 2/1985 | Carlson et al. .................. 445/28 |
| 5,007,513 | A | * | 4/1991 | Carlson .......................... 192/21.5 |
| 5,346,122 | A | * | 9/1994 | Leader et al. ............... 229/162.1 |
| 5,474,302 | A | | 12/1995 | Black, Jr. et al. |
| 5,826,885 | A | * | 10/1998 | Helgeland ...................... 277/302 |
| 5,975,536 | A | * | 11/1999 | Helgeland ...................... 277/410 |
| 6,247,701 | B1 | * | 6/2001 | Kitada et al. .................... 277/410 |
| 6,543,782 | B1 | | 4/2003 | Rosensweig et al. |
| 7,974,384 | B2 | * | 7/2011 | Legall et al. .................... 378/133 |
| 2006/0192345 | A1 | | 8/2006 | Li |

FOREIGN PATENT DOCUMENTS

| EP | 0 297 878 A | 1/1989 |
| WO | WO 2005/106296 A | 11/2005 |

* cited by examiner

*Primary Examiner* — Vishal Patel
(74) *Attorney, Agent, or Firm* — Brinks Hofer Gilson & Lione

(57) ABSTRACT

A magnetic fluid seal includes a pole ring having an inner diameter, a rotatable shaft having an outer diameter, the rotatable shaft configured to extend along the inner diameter of the pole ring between an atmosphere side and vacuum side, at least one magnet coupled to the pole ring, the at least one magnet configured to emit a magnetic field having a strength and a shape, and grooves formed on either the inner diameter of the pole ring or the outer diameter of the shaft, the grooves capable of containing ferromagnetic fluid. The ferromagnetic fluid contained the grooves varies so as to improve the performance of the magnetic fluid seal.

3 Claims, 2 Drawing Sheets

MAGNETIC FLUID SEAL WITH PRECISE CONTROL OF FLUID VOLUME AT EACH SEAL STAGE

CROSS REFERENCE TO RELATED APPLICATION

This application claims priority to U.S. Provisional Patent Application 60/980,977, filed on Oct. 18, 2007, the entirety of which is hereby incorporated by reference.

BACKGROUND OF THE INVENTION

1. Field of the Invention

The invention relates to magnetic fluid seal systems and methods for making the same.

2. Description of the Known Art

During operation of magnetic fluid seals, it has been long observed that microbursts of gas emanate from the magnetic fluid seal into the low-pressure vacuum as the rotation of the magnetic fluid seal is started and stopped. This microburst effect, also known as 'burping', results from gas trapped within each seal annulus of the magnetic fluid seal whose pressure exceeds the individual stage gas pressure retention capability. As the rotation of the magnetic fluid seal is started and stopped, the dynamic characteristics of the magnetic fluid seal change slightly, allowing some of the trapped gas to escape into the low-pressure side of the magnetic fluid seal and into the evacuated volume, undesirably raising its overall pressure.

Additionally, in some applications of magnetic fluid seals, it is acceptable to construct the seal by assembling from an atmosphere side. Other applications impose constraints that require the seal to be assembled from a vacuum side. The latter case tends to impose substantially greater difficulties in controlling the final distribution of fluid within the seal assembly.

BRIEF SUMMARY OF THE INVENTION

In overcoming the drawbacks of the prior art, a method for making a magnetic fluid seal includes the steps of (1) applying ferromagnetic fluid within at least one of a plurality of grooves formed within a rotatable shaft or a pole ring, (2) freezing the ferromagnetic fluid placed within the at least one of the plurality of grooves, and (3) placing the shaft or the pole ring within an opening of a housing of the magnetic fluid seal before the ferromagnetic fluid unfreezes. It should be understood that the opening of the housing of the magnetic fluid seal can be either an atmosphere side opening or a vacuum side opening, thus allowing the magnetic fluid seal to be assembled from either the vacuum side or the atmosphere side.

By freezing the ferromagnetic fluid, a precise amount of ferromagnetic fluid can be held in place during assembly of the magnetic fluid seal. As will be explained in the paragraphs that follow, it has been discovered that mircobursting can be minimized or even eliminated using this technique. Additionally, it has been discovered that magnetic fluid seals with multiple stages perform better when the amount of ferromagnetic fluid placed with the grooves varies as a function of the strength and shape of a magnetic field. Using the method described in the paragraphs that follow, one can now precisely vary the amount of ferromagnetic fluid placed with the grooves to achieve better performance.

DETAILED DESCRIPTION OF THE INVENTION

Figure 1:
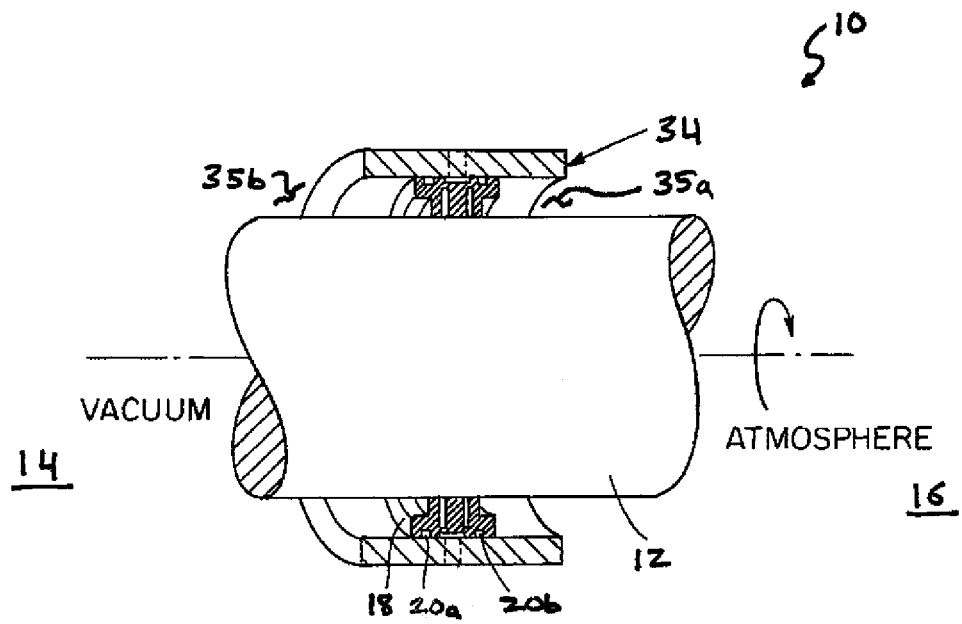
FIG. 1 illustrates a view of a portion of an embodiment of a magnetic fluid seal embodying the principles of the present invention.
Figure 2:
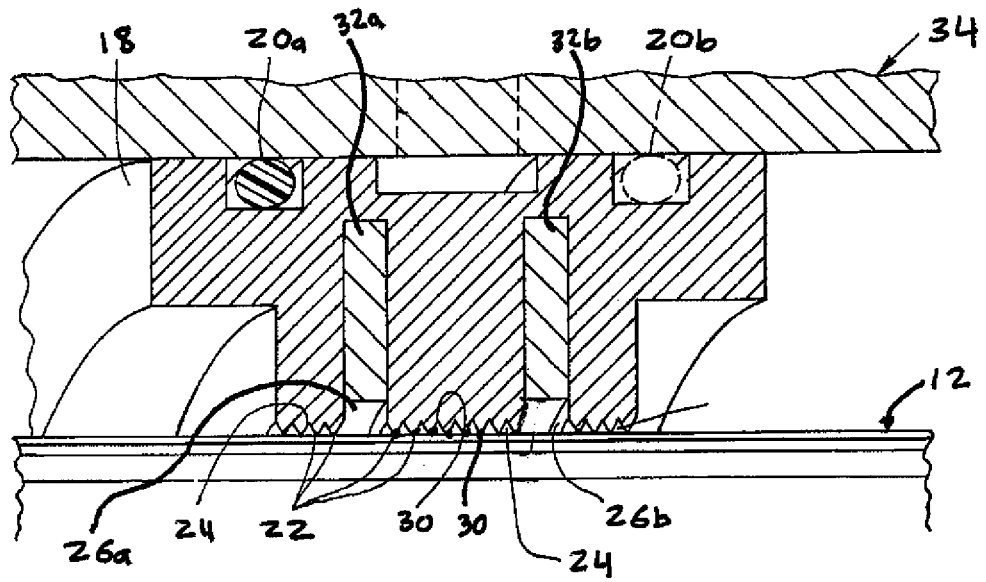
FIG. 2 illustrates a magnified view of a portion of the embodiment of a magnetic fluid seal of FIG. 1.

Referring FIGS. 1 and 2, a first embodiment of a magnetic fluid seal 10 is shown. Here, a shaft 12 extends between a vacuum side 14 and an atmospheric side 16. A single piece of ferromagnetic stainless steel, e.g., 17-4 PH alloy or 400-series stainless steel alloy is machined into a pole ring 18 with an O-ring sealing grooves 20a and 20b formed on the outside diameter and magnetic pole tips 22 on the inside diameter. The pole tips 22 at the inside diameter of the pole ring 18 are machined as a series of small V-grooves 24 in the inside diameter of the pole ring 18.

The pole ring 18 is first made with a smooth bore at a carefully controlled diameter. Then large slots 26a and 26b are machined into the inside diameter of the pole ring 18. Then the series of V-grooves 24 are machined to a depth which leaves a small portion of the original inside diameter intact between each pair of adjacent V-grooves. FIG. 2 shows two slots 26a and 26b and a plurality of V-grooves 24 in an arrangement which results in pole tips 22 which are left over from the original inside diameter bore. It is in the gap between these pole tips 22 and the shaft 12 that the most intense magnetic field develops, and it is here that the magnetic fluid (represented by "dots" 30 in FIG. 2) is retained by magnetic forces.

The slots 26a and 26b are large enough to accept magnets 32a and 32b, respectively. The slot width is slightly larger than the magnet thickness (e.g., 2.05 mm slot width for 2.00 mm magnet thickness). This permits easy insertion of magnets 32a and 32b and allows the magnets to move radially and longitudinally within the slots. As more magnets are inserted, the mutually repulsive force serves to position each magnet 32a and 32b equidistant from its neighbors, thereby automatically providing even spacing throughout the magnet layer. Magnets 32a and 32b are added to each slot 26a and 26b until the slot cannot accept any more magnets.

Typically the magnets 32a and 32b are short cylinders, although they could also be quadrants, sextants, or octants. Rare earth magnets, such as SmCo or NdBFe with high energy products (20 to 35 MGO) are preferred to overcome the losses arising from the inherent shunting effect discussed below. Magnets 32a and 32b are polarized through their thickness (parallel to the shaft axis). Within each magnet slot 26a and 26b the polarity is the same. From one slot to the next, the polarity alternates, so that alternate layers of magnets oppose each other. Any number of magnet layers can be used, but an even number is preferred (for cancellation of fringe fields). One layer is sufficient for all vacuum applications, although two are normally employed. For applications with larger pressure differentials, a greater number of layers can be used. Note that the outer surface of the pole piece 18 is continuous from the atmosphere side to the vacuum side. The continuous outer surface of the pole piece 12 provides a magnetic shunt around each magnet. This dissipates some of the magnetic energy which would otherwise be available to the magnetic circuits which contain the sealing gaps.

A ferrofluid 22 is provided in the tips 22 and the pole piece 18 is affixed to a housing 34 (having openings 35a and 35b) and the housing 34 affixed to a flange (not shown) as described in the parent Helgeland reference U.S. Pat. No. 5,826,885 incorporated herein it its entirety by reference. In turn, the flange can be affixed to a suitable fixture disposed between the two atmospheres with the shaft 12 extending therebetween. It should be understood opening 35a is directly adjacent to the atmospheric side 16, while opening 35b is directly adjacent to the vacuum side 14.

Figure 3:
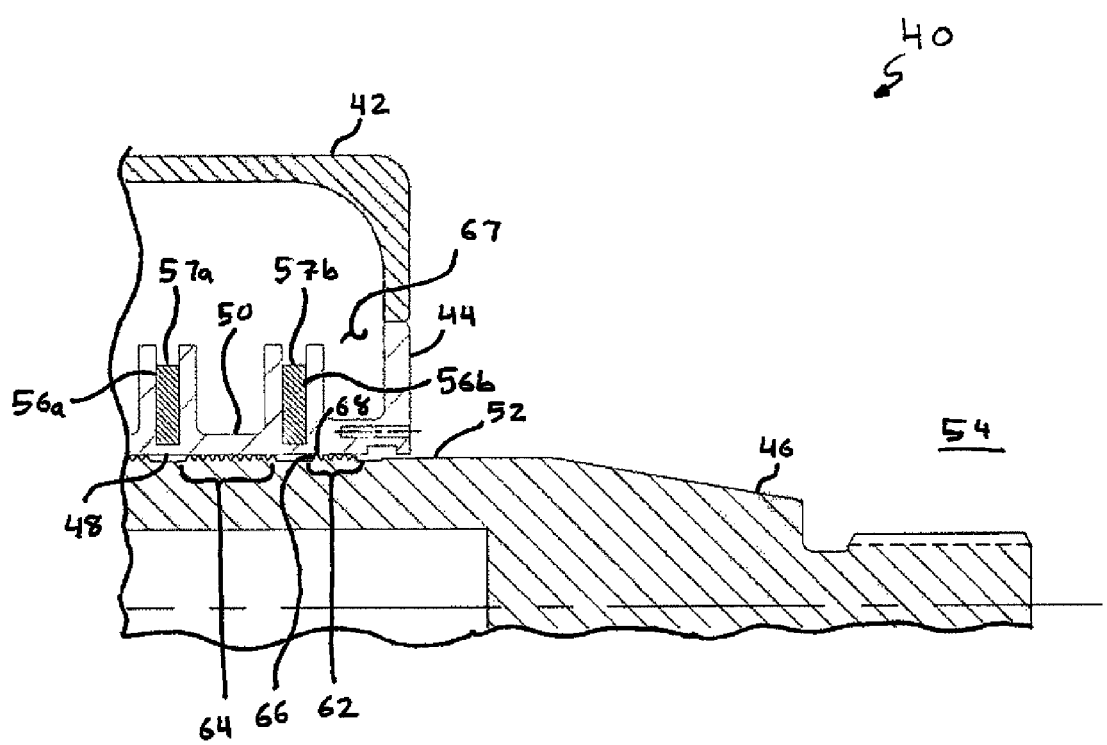
FIG. 3 illustrates a cut away view of a portion of a second embodiment of a magnetic fluid seal embodying the principles of the present invention.

Referring to FIG. 3, another embodiment of a magnetic fluid seal 40 is shown. The magnetic fluid seal 40 includes a housing 42, a pole ring 44 and a shaft 46. The pole ring 44 has an inner diameter 48 and an outer diameter 50. The shaft 46 is rotatable and includes an outer diameter 52. The shaft 46 is configured to extend along the inner diameter 48 of the pole ring 44 between an atmosphere side 54 and vacuum side. The vacuum side generally opposes the atmosphere side 54.

The outer diameter 50 of the pole ring 44 is sized and shaped to include slots 56a and 56b. Magnets 57a and 57b are placed within slots 56a and 56b, respectively. However, it should be understood, as shown in FIG. 1, that the slots may be formed on the inner diameter 48 of the pole ring 44.

The magnets 57a and 57b emit a magnetic field having a size and shape. As will be explained later, this magnet field will function to retain ferromagnetic fluid in place so as to form a seal between the shaft 16 and the pole ring 14.

The shaft 46 includes at least one seal stage 60. As can be seen in FIG. 1, the seal stage 60 may be part of a first set 62 of seal stages. The first set 32 includes five seal stages. A second set 64 includes ten seal stages. Although this embodiment shows the first set 62 and second set 64 of seal stages formed on the outer diameter 52 of the shaft 46, it should be understood that the first set 62 and second set 64 of seal stages may be formed on the inner diameter 48 of the pole ring 44, as shown in FIGS. 1 and 2.

The seal stage 60 generally includes a "V shaped" groove 66 defining a pole tip 68. Ferromagnetic fluid is placed within each seal stage 60. When exposed to a magnetic field from the magnets 57a and 57b, it is in the gap between the pole tips 68 and pole ring 44 that the most intense magnetic field develops, and it is here that the ferromagnetic fluid is retained by the magnetic field.

Additionally, the inventors have discovered that magnetic fluid seals with multiple stages perform better when the amount of ferromagnetic fluid placed within each stage varies as a function of the strength and shape of a magnetic field. The difficulty in varying the ferromagnetic fluid within each stage is that it is difficult to place and hold ferromagnetic fluid in the grooves 66 of each stage 60 when the magnetic fluid seal 40 is manufactured. Using the method described below, which can equally apply to any of the sediments illustrated in FIGS. 1-3, one can now precisely vary the amount of ferromagnetic fluid placed with the grooves to achieve better performance.

The method includes the steps of (1) applying ferromagnetic fluid within at least one of a plurality of grooves 66 formed within the shaft 46 (or a pole ring 18 of FIG. 1), (2) freezing the ferromagnetic fluid placed within the plurality of grooves 36, and (3) placing the shaft 46 (or a pole ring 18 of FIG. 1) within an opening 67 of a housing 42 of the magnetic fluid seal 40 before the ferromagnetic fluid unfreezes. Generally, the ferromagnetic fluid is applied via a syringe like device. Also, it should be understood that the opening of the housing 42 of the magnetic fluid seal can be either on the atmosphere side 54 or the vacuum side, thus allowing the magnetic fluid seal to be assembled from either the atmosphere side 54 or the vacuum side.

The method can further include the steps of applying differing amounts of ferromagnetic fluid within the plurality grooves or even applying the ferromagnetic fluid within some of the grooves, while not applying any ferromagnetic fluid in other grooves. Generally, grooves that located closer to the atmosphere side of the magnetic fluid seal are filled with more ferromagnetic fluid as opposed to the grooves located nearer (or even adjacent) to the vacuum side of the magnetic fluid seal 10, which may contain less or even no ferromagnetic fluid (essentially leaving the stage "dry"). Additionally, the amount of ferromagnetic fluid applied to the grooves may vary as a function of the strength and shape of the magnetic field produced by the magnets 57a and 57b, so as to improve performance. This variance based on the strength and shape of the magnetic field can be determined by experimentation and empirical evidence.

It was mentioned in the background section that during operation of these types of magnetic fluid seals, it has been long observed that micro-bursts of gas emanate from the seal into the low-pressure vacuum as rotation is starts and stops. It has been shown that reducing the pressure of trapped gas within the individual seal stages adjacent to the vacuum side will minimize or eliminate this microbursting effect. It has also been observed that by deliberating creating one or more dry stages closest to the vacuum side, then filling one or more sages immediately adjacent to those dry stages with ferromagnetic fluid in a controlled manner described herein, that some of the ferromagnetic fluid will transfer to the one or more dry stages. During the transfer process, the gas that is trapped within the effected stage is free to be expand into the vacuum side of the seal and be evacuated by the processing pumps. This leaves very low-pressure gas within the new seal stage and satisfies the condition to prevent microbursting by reducing the pressure behind the newly formed seal stage. This method is very important for systems that are pumped down to very low pressures then sealed off with little or no active pumping to remove the undesirable gas emanating from the microbursting.

While this invention has been particularly shown and described with references to a preferred embodiment thereof, it will be understood by those skilled in the art that various changes in form and details may be made therein without departing from the spirit and scope of the invention. Those skilled in the art will recognize or be able to ascertain using no more than routine experimentation, many equivalents to the specific embodiments of the invention described specifically herein.

The invention claimed is:

1. A magnetic fluid seal, the magnetic fluid seal comprising:
   a pole ring having an inner diameter;
   a rotatable shaft having an outer diameter, the rotatable shaft extended along the inner diameter of the pole ring between an atmosphere side and vacuum side;
   magnets coupled to the pole ring, the magnets emit a magnetic field having a strength and a shape;
   a first stage of grooves formed on either the inner diameter of the pole ring or the outer diameter of the shaft, at least one of the grooves of the first stage containing ferromagnetic fluid, wherein the grooves of the first stage extend between an atmosphere side of the magnetic fluid seal and a vacuum side of the magnetic fluid seal, wherein the grooves forming the first stage are continuous and uninterrupted;
   a second stage of grooves formed on either the inner diameter of the pole ring or the outer diameter of the shaft, at least one of the grooves of the second stage containing ferromagnetic fluid, wherein the grooves of the second stage extend between an atmosphere side of the magnetic fluid seal and a vacuum side of the magnetic fluid seal, wherein the grooves forming the second stage are continuous and uninterrupted and are separate from the grooves forming the first stage;

wherein the ferromagnetic fluid contained within at least one of the grooves of the first and second stage varies as a function of the strength and the shape of the magnetic field emitted by the magnet; and wherein the sealing grooves in the first stage contain ferrofluid, wherein the sealing grooves in the first stage located nearer to the atmosphere side contain more ferrofluid than the sealing grooves in the first stage located on the vacuum side.

2. The magnetic fluid seal of claim 1, wherein the grooves formed on the inner diameter of the pole ring.

3. The magnetic fluid seal of claim 1, wherein the grooves formed on the outer diameter of the shaft.

\* \* \* \* \*